(12) United States Patent
Tareen et al.

(10) Patent No.: US 11,229,325 B2
(45) Date of Patent: Jan. 25, 2022

(54) MOTOR WITH INDUCTIVE DECELERATION

(71) Applicant: VITA-MIX MANAGEMENT CORPORATION, Olmsted Township, OH (US)

(72) Inventors: Saifur T. Tareen, Copley, OH (US); David Kolar, Stow, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 352 days.

(21) Appl. No.: 16/343,422

(22) PCT Filed: Oct. 20, 2017

(86) PCT No.: PCT/US2017/057642
§ 371 (c)(1),
(2) Date: Apr. 19, 2019

(87) PCT Pub. No.: WO2018/075918
PCT Pub. Date: Apr. 26, 2018

(65) Prior Publication Data
US 2019/0313856 A1    Oct. 17, 2019

Related U.S. Application Data

(60) Provisional application No. 62/410,454, filed on Oct. 20, 2016, provisional application No. 62/486,839, filed on Apr. 18, 2017.

(51) Int. Cl.
*A47J 43/00*    (2006.01)
*A47J 43/08*    (2006.01)
(Continued)

(52) U.S. Cl.
CPC ......... *A47J 43/085* (2013.01); *A47J 43/0465* (2013.01); *B01F 13/04* (2013.01);
(Continued)

(58) Field of Classification Search
CPC .................. A47J 43/0465; B01F 13/04; B01F 2215/0026; H01H 15/06; H02K 21/24
See application file for complete search history.

(56) References Cited

U.S. PATENT DOCUMENTS 3,548,280 A    12/1970  Cockroft
5,347,205 A    9/1994   Piland
(Continued)

FOREIGN PATENT DOCUMENTS

EP    2368469    9/2011
FR    2140891    1/1973
(Continued)

OTHER PUBLICATIONS

Extended European Search Report in connection with European Patent Application No. 17861445.9 dated May 15, 2020; 7 pages.
(Continued)

*Primary Examiner* — Anshu Bhatia
(74) *Attorney, Agent, or Firm* — McDonald Hopkins LLC

(57) ABSTRACT

A motor is generally described. The motor may include an armature and a coil. The coil and armature operatively receive power from a power source. The power induces magnetic fields in the coil and armature to drive the armature. When power is removed, the coils reverse polarity to inductively decelerate the armature.

15 Claims, 4 Drawing Sheets

(51) Int. Cl.
    *A47J 43/046*     (2006.01)
    *B01F 13/04*     (2006.01)
    *H01H 15/06*     (2006.01)
    *H02K 21/24*     (2006.01)

(52) U.S. Cl.
    CPC ............ *H01H 15/06* (2013.01); *H02K 21/24* (2013.01); *B01F 2215/0026* (2013.01)

(56) References Cited

U.S. PATENT DOCUMENTS

| | | | |
|---|---|---|---|
| 7,098,616 B1 * | 8/2006 | Tsai | A47J 43/085 |
| | | | 318/54 |
| 2009/0303830 A1 | 12/2009 | Wilson | |
| 2012/0001002 A1 | 1/2012 | Donaldson et al. | |
| 2014/0286120 A1 * | 9/2014 | Kolar | B01F 13/047 |
| | | | 366/142 |
| 2015/0190015 A1 | 7/2015 | Koninklijkie | |
| 2016/0256004 A1 | 9/2016 | Kolar et al. | |
| 2016/0256007 A1 | 9/2016 | Dickson et al. | |

FOREIGN PATENT DOCUMENTS

| | | |
|---|---|---|
| FR | 2447703 | 8/1980 |
| WO | 2016/134063 A1 | 8/2016 |

OTHER PUBLICATIONS

International Search Report and Written Opinion dated Jan. 8, 2018; International Patent Application No. PCT/US2017/057642 filed on Oct. 20, 2017. ISA/US.

* cited by examiner

MOTOR WITH INDUCTIVE DECELERATION

CROSS-REFERENCE TO RELATED APPLICATIONS

This application is a 35 U.S.C. 071 national stage application of PCT Application No. PCT/US2017/057642 filed on Oct. 20, 2017, entitled "MOTOR WITH INDUCTIVE DECELERATION," which claims priority to U.S. Provisional Patent Application No. 62/410,454 filed on Oct. 20, 2016, and U.S. Provisional Patent Application No. 62/486,839 filed Apr. 18, 2017, which are both entitled "MOTOR WITH INDUCTIVE DECELERATION," all of which are incorporated herein by reference in their entirety.

BACKGROUND

Many appliances use motors to convert electrical energy to mechanical energy. Blenders, for examples, use motors to blend or mix drinks or other food. Blenders are used in homes and businesses. When utilized in businesses, such as restaurants or coffee shops, the blender is often positioned adjacent to a serving or dining area so that the food or drinks may be prepared as ordered. When so placed, the sound emitted by the blender can disturb or distract customers as it processes or mixes a drink.

The motor is a direct source of noise when in operation, and also is an indirect source of noise due to the vibration it creates within the blender base. Blender bases must also be large enough to house the motor. Further, users must wait for the motor to stop before they remove contents from a container.

Other appliances use motors to perform other tasks. In these appliances, motors also contribute to noise, size limitations, and time required to perform their tasks. It, therefore, is desirable to provide a motor that may reduce noise, efficiently operate, and that may be reduced in size.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A blender system is described. The blender system includes a blender base comprising a motor and a housing that houses the motor. The motor comprises an armature; and a coil selectively coupled to a power supply, wherein the coil generates a magnetic field having a first polarity when power is supplied to the coil, and generates a second field having a second polarity when the power is disconnected from the coil. The system may include a switching circuit comprising a first relay that operatively connects a power source to a first portion of the coil in an open state and disconnects the power source from the first portion of the coil when in the closed state. The first relay connects the first portion of the coil to a braking resistor when in the closed state. The switching circuit further comprises a second relay that operatively couples a first node of the armature to a second portion of the coil when the second relay is open state and connects a second node of the armature to the second portion of the coil in when the second relay is closed. The switching circuit delays closing the second relay after closing the first relay. The second relay operatively couples the first portion of the coil to the second node of the armature when the second relay is open. The second relay operatively couples the first portion of the coil to the first node of the armature when the second relay is closed. The coil may drive the armature when power is supplied to the coil and brakes the armature when power is removed from the coil. The coil comprises the run coil and the stop coil so that the motor does not include any other coils for running or stopping the armature.

A blender system comprises a housing operatively housing a motor, wherein the motor comprises: an armature coupled to a drive shaft; and a coil that is selectively coupled to a power supply, wherein the coil generates a magnetic field having a first polarity that induces rotation of the armature when power is supplied to the coil, and generates a second field to decelerate the rotation of the armature when power is not supplied to the coil. The system includes container operatively attachable to the housing and a lid operatively attached to the container. The housing comprises a first near-field communication component coupled to the motor, and the container comprises a second near-field communication component, wherein the first near-field communication component communicates with the second near-field communication component when the container is operatively attached to the housing. The system includes a switch that operatively allows for operation of the motor based at least in part on whether the container is interlocked with the housing.

A blender system is described and includes a housing operatively housing a motor, and an interface disposed on the housing and operatively controlling the motor; wherein the motor comprises: an armature coupled to a drive shaft; a run and stop coil that is selectively coupled to a power supply, wherein the interface selectively controls the power supply to supply power to the run and stop coil, and wherein the run and stop coil generates a first magnetic field having a first polarity when the interface allows power to be supplied to the run and stop coil, and wherein the run and stop coil generates a second magnetic field to decelerate the rotation of the armature generally when the interface removes power from the motor. The interface comprises at least one of a switch, knob, or touch sensitive input device. The run and stop coil maintains the first magnetic field after power is removed from the run and stop coil for a predetermined amount of time. The motor does not include brake pads. The system includes a braking resistor operatively coupled the run and stop coil when the interface removes power from the motor and decoupled when the interface allows power to be supplied to the run and stop coils.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Figure 1:
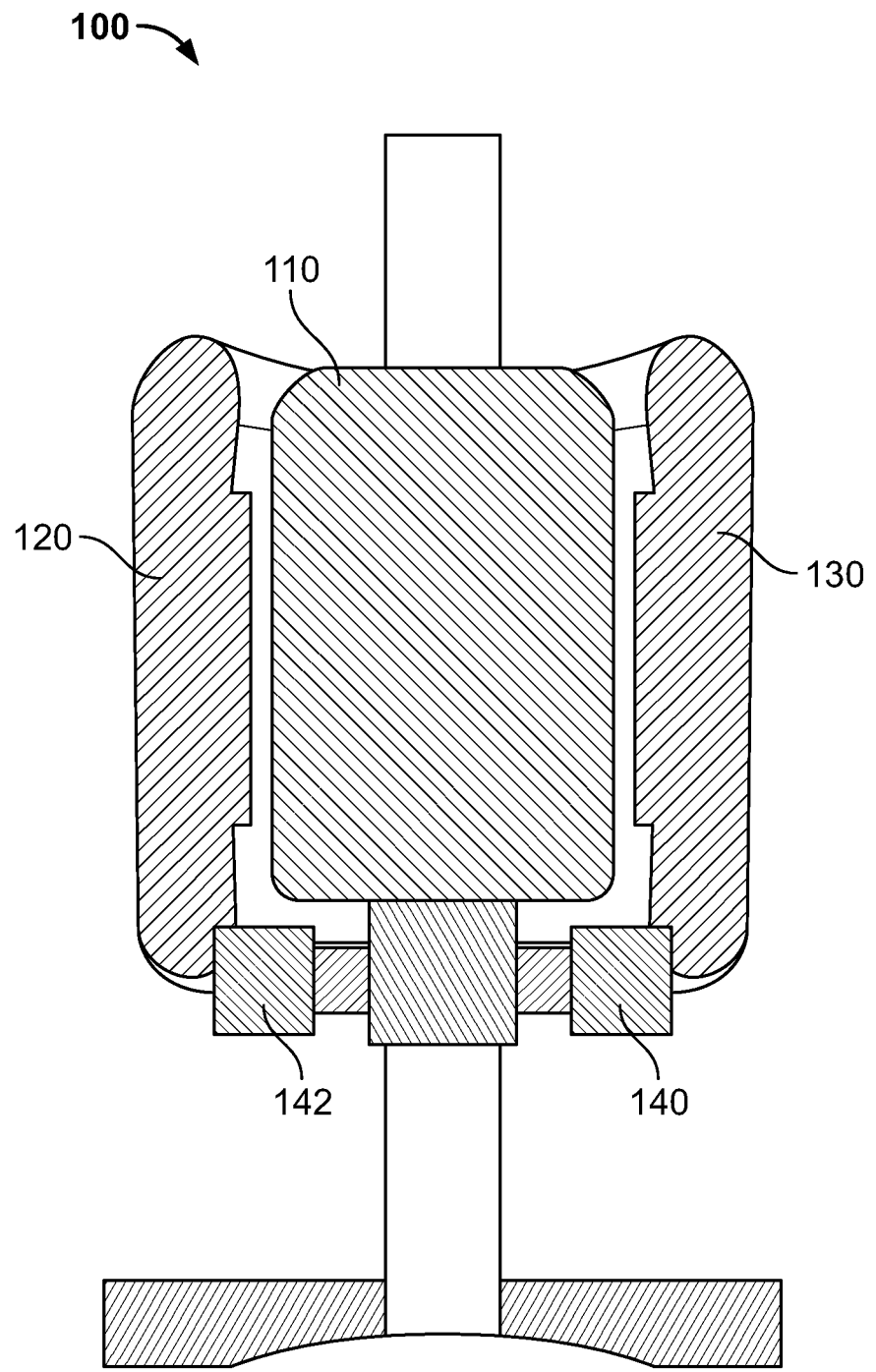
FIG. 1 illustrates a cross-sectional view of a prior art motor.

Reference will now be made in detail to exemplary embodiments of the present invention, examples of which are illustrated in the accompanying drawings. It is to be understood that other embodiments may be utilized, and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, home appliances, fans, power tools, or other machines using motors. As such, references to a blender, blending system, and the like, are understood to include the various other machines.

Blender systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuff" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Turning to FIG. 1, there is a universal motor 100. This motor 100, as well as some other traditional motors, may be utilized by a blender. The motor 100 converts energy (e.g., electrical energy) into mechanical energy. The motor 100 operates with direct current (DC) or alternating current (AC). For the sake of brevity and in addition to what is shown and described in more detail below, the motor 100 is described as a brushless DC motor herein.

Motor 100 may include an armature 110 that is motivated by electrically created magnetic fields within the motor 100 to convert the electrical energy into mechanical energy. The armature may receive power via brushes 140 and 142. As electrical energy flows through stationary conductive coils 120 (e.g., a motor field) and the armature (e.g., in parallel, in series, etc.). As current passes through the coils 120 in the field and the armature 110, magnetic fields are created by each of them. The attracting and repelling of these fields cause the armature 110 to rotate.

As current increases through the motor 100, the magnetic fields created by both the armature 110 and coils 120 and 130 increase. A user may turn off the motor 100 by removing the power. The inertia of the armature 110, however, causes the armature 110 to continue rotation. As such, the armature 110 continues to spin after the motor 100 is turned off. In some instances, the continued spinning results in inefficiencies. For example, a user may blend foodstuff with a blender. The user may turn off the motor 100 and may wish to remove a container from the blender base. Continued spinning of the motor 100 causes a delay while the user waits for the blades to stop rotating. In certain commercial kitchens, time is critical when preparing foodstuff. The delay as a user waits for the motor to finish spinning is increased by the fact that such commercial kitchens often repeatedly use a blender.

In an aspect, the inductive coils may comprise run coils 120 and stop coils 130. While the motor 100 is powered, the run coils 120 are energized. When the motor is powered off, the energy to the run coils 120 is removed and the stop coils 130 may be shorted. This causes inductive deceleration of the armature 110 allowing the motor 100 to stop faster than it would without inductive deceleration. This, however, requires separate run coils 120 and stop coils 130. Such additional coils add to cost, size, and weight.

Embodiments described herein may provide for deceleration of the armature without mechanical brake pads. In another aspect, embodiments may provide for reduced size of a motor due, at least in part, to a reduced number of coils relative to some traditional universal motors. For instance, disclosed motors may include an armature that rotates to drive a shaft. An inductive coil may be disposed proximal the armature. Current in the inductive coil and the armature may cause rotation of the armature. When a user turns off the motor, the power to the inductive coil is removed and the polarity of the inductive coil is reversed. When the power is turned off, the armature may act as a generator (e.g., it may produce an electric field based on its inertia). The reversed polarity of the inductive coils may drive the armature in an opposite direction to inductively decelerate the armature. This may allow the inductive coil to act as both a run and a stop coil.

Figure 2:
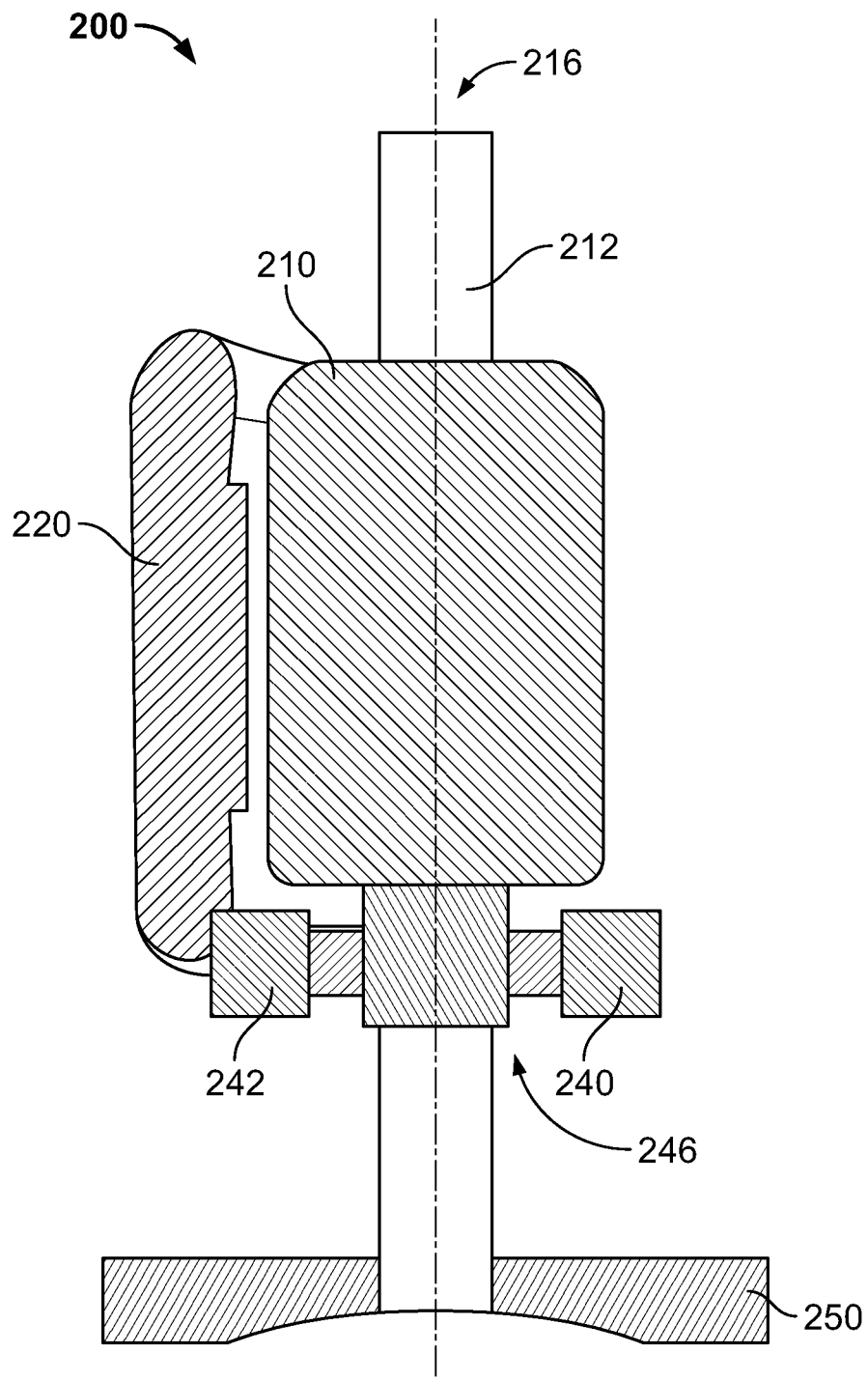
FIG. 2 illustrates a cross-sectional view of a motor in accordance with various disclosed aspects.

Turning to FIG. 2, there is a motor 200 in accordance with various disclosed aspects. The motor 200 may primarily include an armature 210 and coils 220. It is noted that the motor 200 may be utilized by various systems, such as blenders or the like. Moreover, motor 200 may include other components such as axle 212, brushes 240 and 242, commutator 246, and the like. In some embodiments, the motor 200 may comprise a serial universal motor. It should be understood, however, that the motor 200 may be of any appropriate configuration and is not limited to the motor shown.

The commutator 246 and brushes 240/242 may provide power to the armature 210. The armature 210 may drive the axle 212 to cause rotation about axis 216. It is noted that axle 212 may include, be coupled with, or otherwise may be attachable to various desired components. For instance, the axle 212 may be operatively coupled to a splined coupling, a blender blade (or other blade), a fan (e.g., fan 250), or the like.

Coils 220 may be operatively utilized as both run and stop coils. When powered on, the coils 220 may generate an electric field that causes the armature 210 to rotate. When powered off, energy is removed from the coils 220 and their polarity is changed. During this time, the armature 210 may continue to rotate and may generate an electric field from the rotation (e.g., which may be caused by inertia). Changing the polarity of the coils 220 may generate an electric field that forces the armature 210 to decelerate in the opposite direction that it revolves during operation. This may cause the armature 210 to stop rotating the axle 212 faster than allowing the armature 210 stopping rotation due from inertia.

It is noted that various circuitry components may be employed to change the polarity of the coils 220. For instance, a switch (not shown) may couple the coils 220 to a power source when the switch is closed (e.g., the motor is powered on), and may couple the coils 220 to a ground when the switch is open (e.g., the motor is powered off). It is noted that the state of the switch (e.g., open or closed) is relative and other nomenclatures may be utilized as desired.

In at least some embodiments, the switches may be controlled via an interlock mechanism. For instance, a container and/or lid may comprise inductive coils that interact with coils within a blender base. When the lid and container are operatively attached to a blender base (such as via a pedestal), the coils of the container and/or lid may complete a circuit which may allow for operation of the motor 200. In one example, the coils 220 may act as the interlocking coils for a blender base.

Figure 3:
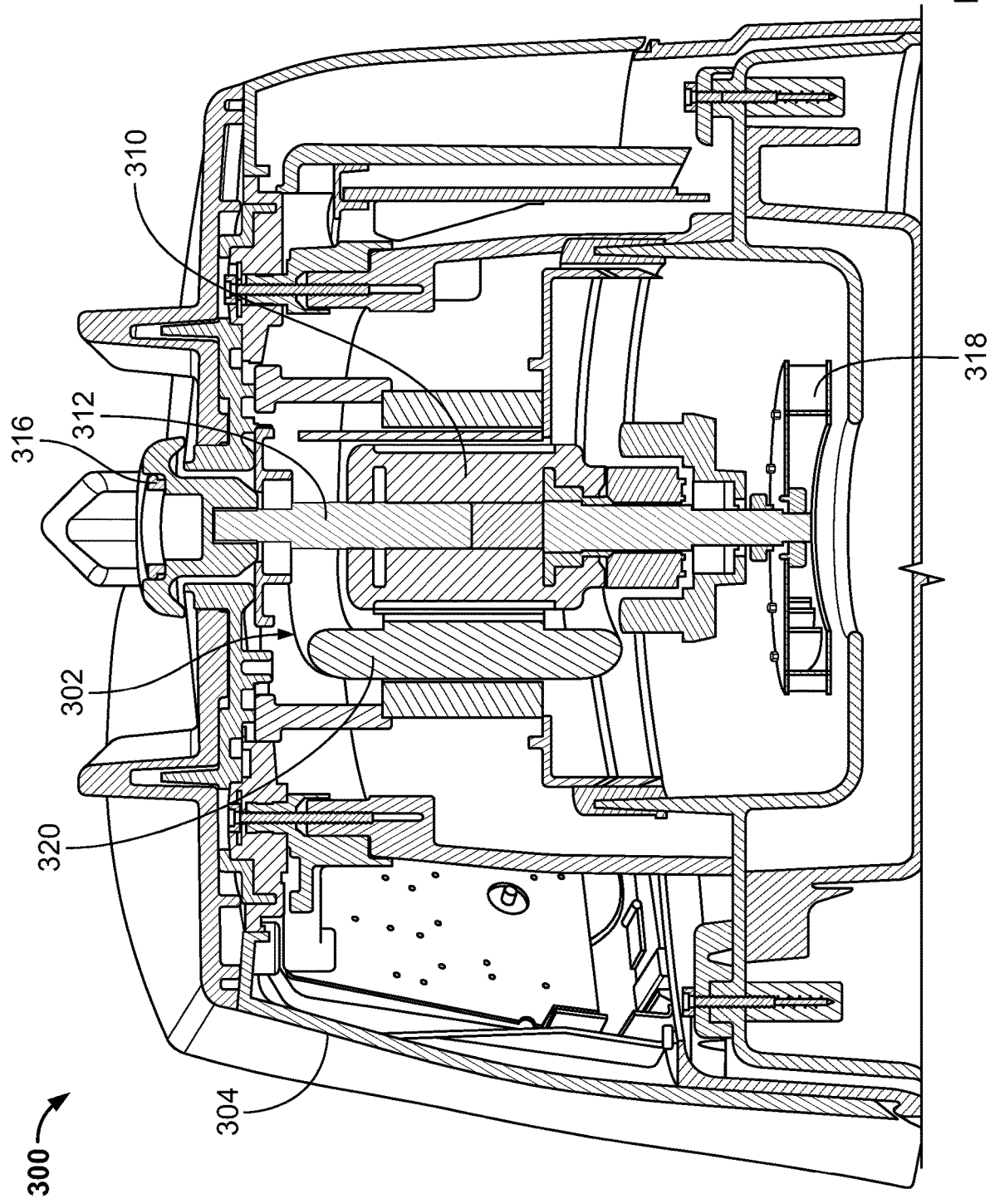
FIG. 3 illustrates a cross-sectional view of a blender comprising a motor in accordance with various disclosed aspects.

FIG. 3 is an exemplary blender base 300 for a blending system that may include a housing 304 that houses a motor 302 in accordance with various disclosed aspects. The motor 302 may include an armature 310 and coil 320. The armature 310 may drive an axle 312. Axle 312 may be coupled with a splined coupler 316 at one end, and a fan 318 at another end. The coil 320 may operate as a run and stop coil to drive and stop both the splined coupler 316 and fan 318.

When powered on, the coil 320 drives the armature 310. For instance, current applied to the coil 320 generates a magnetic field. This field forces the armature 310 to rotate. The armature 310 drives the axle 312 as it rotates. Rotation of the axle 312 causes rotation of the splined coupler 316 and the fan 318. In an aspect, a blender container (not shown) may include a blade assembly (not shown). The blade assembly may include a male splined coupler that may be received by the splined coupler 316 of the axle 312. As described herein, the coil 320 may inductively stop the armature 310 from rotating when power is removed.

It is noted that the blender base 300 may include a switch or other components (not shown) that enable or disable the motor 302 based on whether the container and/or blade assembly are operatively coupled to the housing 304. In another aspect, the switch may be altered based on whether the container, blade assembly, and a lid (not shown) are operatively attached to the blender base. For instance, the blender base 300 may include a reed switch coupled to the motor 302. The reed switch may enable operation of the motor 302 when the container is attached to the blender base with the container lid coupled to the container. The reed switch may disable operation of the motor 302 when the container lid and/or container are not operatively coupled.

In one or more embodiments, the reed switch may operatively change the polarity of the coils. For instance, if the motor 302 is powered on with the container and lid engaged with the blender system, the reed switch may be closed to allow for operation of the motor 302. If the container and/or lid are removed while the motor is powered on, the reed switch may open. The open reed switch may cut power to the motor 302. When the motor is powered off, the coil 320 may be operatively reversed in polarity. The reserving in polarity may inductively and rapidly decelerate the motor. In such embodiments, the coil 320 may be operatively connected to a resistor. After a calculated or predetermined wait period, the polarity of the run-coils or coil 320 may be inverted with respect to the armature. The amplitude of the braking force and stopping time of the motor can be varied as a requirement.

According to an embodiment, the blender base 300 may include a wireless communications component, such as a near-field communications ("NFC") component. The wireless communications component may operatively communicate with a communications component disposed in at least one of the blender container, lid, blade assembly, or other component. The blender base 300 may selectively control operation of the motor 302 based on communications between the blender base 300 and the container or other component. As an example, an NFC component of the blender base 300 may operatively sense or communicate with an NFC component disposed in or on a blender container. When the container is operatively placed on the blender base 300, the NFC component of the blender base 300 may allow the motor 302 to operate. If the container is removed, the NFC component of the blender base 300 senses the removal and the blender base 300 prevents operation of the motor 302 and/or initiates inductive deceleration of the motor 302 to stop the armature 310 from rotating. As described herein, inductively decelerating the motor may comprise reversing the polarity of the coil 320.

Figure 4:
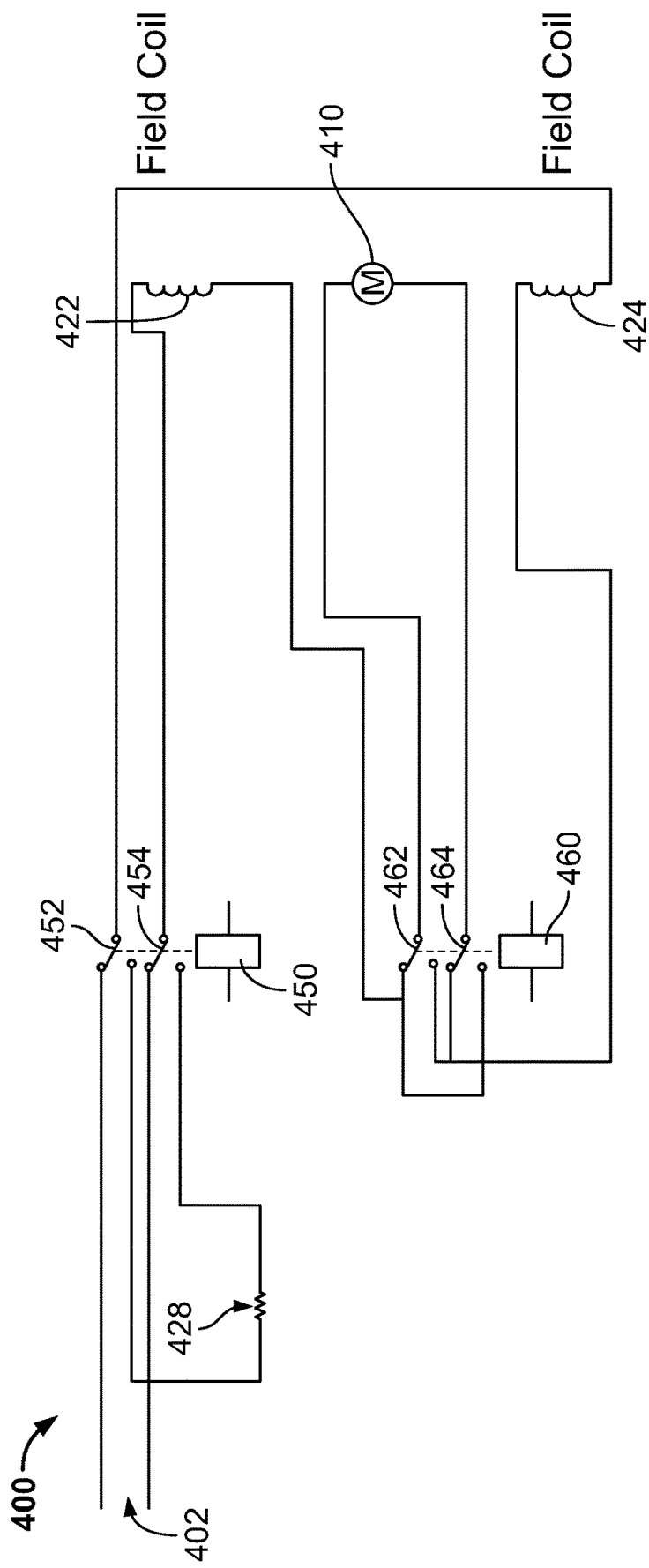
FIG. 4 illustrates a schematic of an inductive braking system for a blender.

Turning to FIG. 4, an inductive braking system 400 of a blender is shown. The inductive braking system 400 may comprise similar aspects as described with reference to FIGS. 2-3. Moreover, the inductive braking system 400 may be disposed within a blender base (e.g., blender base 300).

Inductive braking system 400 may include a single set of coils 420 that may operatively drive and inductively decelerate an armature 410. For instance, when power is applied to the coils 420 and the armature 410, the coils 420 generate a field that drives the armature 410 to rotate. It is noted that the armature 410 may be coupled with a drive shaft as described herein.

In another aspect, the inductive braking system 400 may include a switching circuit that comprises one or more relays, such as relay R1 450 and relay R2 460. R1 450 may include switches 452 and 454. R2 460 may include relays 462 and 464. The relays R1 450 and R2 460 may operatively switch the coils 420 between a driving or resting state and a decelerating state in accordance with various described embodiments. In the driving state, the coils 420 may be coupled to a power source. In the decelerating state, the coils 420 may be coupled in series to a braking resistor 428. As such, the coils 420 may reverse polarity to inductively decelerate the armature 410.

In the rest position, a power source 402 applies power to switch 454. Switch 454 connects the power source 402 to and a coil that may comprise a first and second portion 422/424. In an aspect, the first and second portions may be referred to as coil 422 and coil 424 for sake of brevity. The power induces current in coil 422. The coil 422 is coupled to the armature 410 through switch 462. The armature 410, in turn, is connected to coil 424 through switch 464. The other terminal of coil 424 may be connected to a ground 404. When the power source 402 applies power, the coils 422 and 424 drive the armature 410 and the motor can be normally operated by the applicable power source 402.

To stop the motor, the following sequences may be activated. R1 450 may be marked by closing switch 452 and switch 454. Closing switches 452 and 454 may couple the coils 422 and 424 to the braking resistor 428. This may remove the power source 402. In embodiments, the system 400 may allow for a delay or wait time as the armature 410 coasts down to a lower speed before inductive deceleration is induced. According to some embodiments, there may not be a wait time, the wait time may be adjusted (e.g., such as based on the speed of the armature 410 rotation), or the like.

Inductive braking may begin when R2 460 is marked and switches 462 and 464 are closed. As shown, the terminals of armature 410 are flipped. Thus, inductive braking begins and the armature 410 rotation is slowed to a stop. Stopping time of the armature 410 may be controlled by the value of the braking resistor 428. After the armature 410 is stopped, both relays R1 450 and R2 460 can be returned to a resting state. It should be understood, however, that the order of sequences disclosed herein are merely exemplary and not exhaustive. The order may be modified, steps may be modified from the disclosed order, steps may be skipped, steps may be combined, and steps may be added without departing from the present teachings.

It is noted that embodiments may include other components not shown for sake of brevity. For instance, a motor may include mechanical brakes that may be used in conjunction with inductive deceleration. It is further noted that various modifications are within the scope and spirit of this disclosure. For instance, a drive coupler may comprise different components, shapes, or the like. Moreover, drive sockets may or may not be splined. As such, various other mechanisms may be utilized for attaching a blade assembly to a drive coupler. Moreover, while embodiments have been illustrated as comprising a clip, tabs, or the like, a drive coupler may be attached to a drive shaft by various other methods, such as threaded connections, screws, bolts, rivets, other fasteners, magnetic connections, welding, or the like.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A blender system comprising:
    a blender base comprising a motor and a housing that houses the motor,
    wherein the motor comprises:
        an armature; and
        at least two coils selectively coupled to a power supply, wherein the at least two coils generate a magnetic field having a first polarity when power is supplied to the at least two coils, and generate a second field having a second polarity when the power is disconnected from the at least two coils; and
    a switching circuit comprising:
        a first relay that operatively connects a power source to the at least two coils in an open state and, when in a closed state, disconnects the power source from and connects a braking resistor to the at least two coils when in the closed state; and
        a second relay that operatively couples a first node of the armature to a second portion of the at least two coils when the second relay is open state and connects a second node of the armature to the second portion of the at least two coils in when the second relay is closed such that the polarity of the armature is reversed with reference to the at least two coils.

2. The blender system of claim 1, wherein the switching circuit delays closing the second relay after closing the first relay.

3. The blender system of claim 1, wherein the second relay operatively couples the first portion of the at least two coils to the second node of the armature when the second relay is open.

4. The blender system of claim 3, wherein the second relay operatively couples the first portion of the at least two coils to the first node of the armature when the second relay is closed.

5. The blender system of claim 1, wherein the at least two coils drive the armature when power is supplied to the at least two coils and brakes the armature when power is removed from the at least two coils.

6. The blender system of claim 1, wherein the at least two coils comprise a run coil and a stop coil.

7. The blender system of claim 6, wherein the motor does not include any other coils for running or stopping the armature.

8. A blender system comprising:
    a housing operatively housing a motor,
    wherein the motor comprises:
        an armature coupled to a drive shaft;

a coil that is selectively coupled to a power supply, wherein the coil generates a magnetic field having a first polarity that induces rotation of the armature when power is supplied to the coil, and generates a second field to decelerate the rotation of the armature when power is not supplied to the coil;

a container operatively attachable to the housing, wherein the housing further comprises a first near-field communication component coupled to the motor, and the container comprises a second near-field communication component, wherein the first near-field communication component communicates with the second near-field communication component when the container is operatively attached to the housing.

9. The blender system of claim 8, further comprising a switch that operatively allows for operation of the motor based at least in part on whether the container is interlocked with the housing.

10. The blender system of claim 8, further comprising a lid operatively attached to the container.

11. A blender system comprising:
a blender base comprising a motor and a housing that houses the motor, wherein the motor comprises:
an armature; and
at least two coils selectively coupled to a power supply, wherein the at least two coils generate a magnetic field having a first polarity when power is supplied to the at least two coils, and generate a second field having a second polarity when the power is disconnected from the at least two coils;
a container operatively attachable to the housing, wherein the housing further comprises a first near-field communication component coupled to the motor, and the container comprises a second near-field communication component, wherein the first near-field communication component communicates with the second near-field communication component when the container is operatively attached to the housing;
a switching circuit comprising:
a first relay that operatively connects a power source to the at least two coils in an open state and, when in a closed state, disconnects the power source from and connects a braking resistor to the at least two coils when in the closed state; and
a second relay that operatively couples a first node of the armature to a second portion of the at least two coils when the second relay is open state and connects a second node of the armature to the second portion of the at least two coils in when the second relay is closed such that the polarity of the armature is reversed with reference to the at least two coils.

12. The blender system of claim 11 further comprising an interface disposed on the housing and operatively controlling the motor.

13. The blender system of claim 12, wherein the interface comprises at least one of a switch, knob, or touch sensitive input device.

14. The blender system of claim 12, further comprising a braking resistor operatively coupled to the at least two coils when the interface removes power from the motor and decoupled when the interface allows power to be supplied to the at least two coils.

15. The blender system of claim 11, wherein the motor does not include brake pads.

* * * * *